US012104885B2

(12) United States Patent
Lynn et al.

(10) Patent No.: US 12,104,885 B2
(45) Date of Patent: Oct. 1, 2024

(54) LASER INDUCED PLASMA TARGETS FOR USE AS AN ELECTROMAGNETIC TESTBED

(71) Applicant: United States of America as represented by the Secretary of the Navy, San Diego, CA (US)

(72) Inventors: Brittany E. Lynn, San Diego, CA (US); Alexandru Hening, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 405 days.

(21) Appl. No.: 17/657,061

(22) Filed: Mar. 29, 2022

(65) Prior Publication Data

US 2023/0314108 A1 Oct. 5, 2023

(51) Int. Cl.
*A61B 18/20* (2006.01)
*F41H 13/00* (2006.01)
*F41J 2/00* (2006.01)
*G01S 7/40* (2006.01)
*G01S 13/04* (2006.01)

(52) U.S. Cl.
CPC .............. *F41J 2/00* (2013.01); *F41H 13/005* (2013.01); *G01S 7/40* (2013.01); *G01S 13/04* (2013.01)

(58) Field of Classification Search
CPC .......... A61B 18/20; F41J 2/00; F41H 13/005; G01S 7/40; G01S 13/04; G01S 7/4086; G01S 13/931; G01S 7/4095
See application file for complete search history.

(56) References Cited

U.S. PATENT DOCUMENTS

| 10,490,965 B1 | 11/2019 | Pascoguin et al. |
| 10,508,889 B1 | 12/2019 | Lynn et al. |
| 2009/0017318 A1* | 1/2009 | Ruuttu ............... B23K 26/0821 428/457 |

(Continued)

OTHER PUBLICATIONS

Couairon, et all,Filamentation length of powerful laser pulses, Appl. Phys. B 76, 789 (2003); Centre de Physique Th'eorique, Ecole Polytechnique, CNRS UMR 7644, 91 128 Palaiseau Cedex, France.

(Continued)

*Primary Examiner* — Abdullahi Nur
(74) *Attorney, Agent, or Firm* — Naval Information Warfare Center, Pacific; Kyle Eppele; Evan Hastings (57) ABSTRACT

A method and system for generating laser induced plasma targets for use as an electromagnetic testbed. A method comprising the steps of propagating an intense laser pulse in a media, dividing the laser pulse into a plurality of lasers, focusing each of the plurality of lasers, directing each of the plurality of lasers into a testbed and rastering a plasma-based array, wherein the array is reflective of incident frequencies. Additionally, a plasma target system comprising: a laser source, a focus lens, a steering system, a plasma-based array, and an interrogation system. The laser source generates a short laser pulse. The focus lens focuses the laser pulse. The steering system directs the laser pulse into a test bed. The plasma-based array serves as a target for the testbed. The interrogation system utilizes an incident frequency for tracking the plasma-based array.

20 Claims, 6 Drawing Sheets

(56) References Cited

U.S. PATENT DOCUMENTS

| | | | |
|---|---|---|---|
| 2009/0180114 A1* | 7/2009 | Fujii | G01N 21/718 356/318 |
| 2010/0196624 A1* | 8/2010 | Ruuttu | B23K 26/0673 118/620 |
| 2016/0097616 A1* | 4/2016 | Weigold | F41H 13/0062 250/396 R |
| 2018/0162142 A1* | 6/2018 | Kucera | B23K 26/355 |
| 2020/0041236 A1 | 2/2020 | Hening et al. | |

OTHER PUBLICATIONS

Houard, Aurélien & D'Amico, Ciro & Liu, Yi & Andre, Yves-Bernard & Franco, Michel & Prade, Bernard & Salmon, Estelle & Pierlot, Pascal & Cleon, L.-M & Mysyrowicz, André. (2007). High Current Permanent Discharges in Air Induced by Femtosecond Laser Filamentation. Applied Physics Letters. 90. 1-2. 10.1109/QELS.2007.4431068. 3Agence d'Essai Ferroviaire, SNCF, 21 Av du Président Allende, 94407, Vitry-sur-seine, France.

J. Mathew, "Electronically steerable plasma mirror based radar—concept and characteristics," IEEE AES Sys. Mag., Oct. 38 (1996). pp. 39-44. USA.

* cited by examiner

LASER INDUCED PLASMA TARGETS FOR USE AS AN ELECTROMAGNETIC TESTBED

FEDERALLY-SPONSORED RESEARCH AND DEVELOPMENT

The United States Government has ownership rights in this invention. Licensing inquiries may be directed to Office of Research and Technical Applications, Naval Warfare Information Center, Pacific, Code 72120, San Diego, CA, 92152; telephone (619) 553-5118; email: niwc_patent.fct@us.navy.mil, referencing Navy Case 106,219.

FIELD OF THE INVENTION

The present disclosure pertains generally to using laser induced plasma filaments for targets in an electromagnetic testbed.

BACKGROUND OF THE INVENTION

Testing and calibrating a radar system is currently limited by constraints of the testbed environment. Large test targets moving at high speeds require vast amounts of energy to speed up, travel safely, and slow down. Testbeds, therefore, typically are very large to handle the substantial momentums. This challenge is accentuated in indoor testing facilities where space is difficult to allocate and the confined areas make such high speeds more dangerous. There is a significant need for radar test targets that increase safety and efficiency in testbed environments.

Recent developments in laser technologies have made possible the propagation of mirror-like plasma arrays which do not carry momentum, but reflect incident energies. It would be desirable to have test targets that avoid the energy costs and risks of propelling an object at high speeds.

SUMMARY

Disclosed herein is a method comprising the steps of: propagating an intense laser pulse in a media, dividing the laser pulse into a plurality of lasers, focusing each of the plurality of lasers, directing each of the plurality of lasers into a testbed, and rastering a plasma-based array, wherein the array is reflective of incident frequencies. Furthermore, disclosed herein is a method to detect a plasma-based test target comprising the steps of: using a laser source and optical beam forming techniques to create a plurality of plasma-based points, generating a plasma target with the plurality of plasma-based points, wherein the plasma target appears solid to incident frequencies, directing an incident energy from an interrogation system to the plasma target, wherein the interrogation system detects the location of the plasma-based target, and receiving reflected energy, wherein the reflected energy indicates the instantaneous location of the plasma-based target to an interrogation system. Additionally, disclosed herein is a plasma target system comprising: a laser source, a focus lens, a steering system, a plasma-based array, and an interrogation system. The laser source generates a short laser pulse. The focus lens focuses the laser pulse. The steering system directs the laser pulse into a test bed. The plasma-based array serves as a target for the testbed. The interrogation system utilizes an incident frequency for tracking the plasma-based array.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed system and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other system and methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
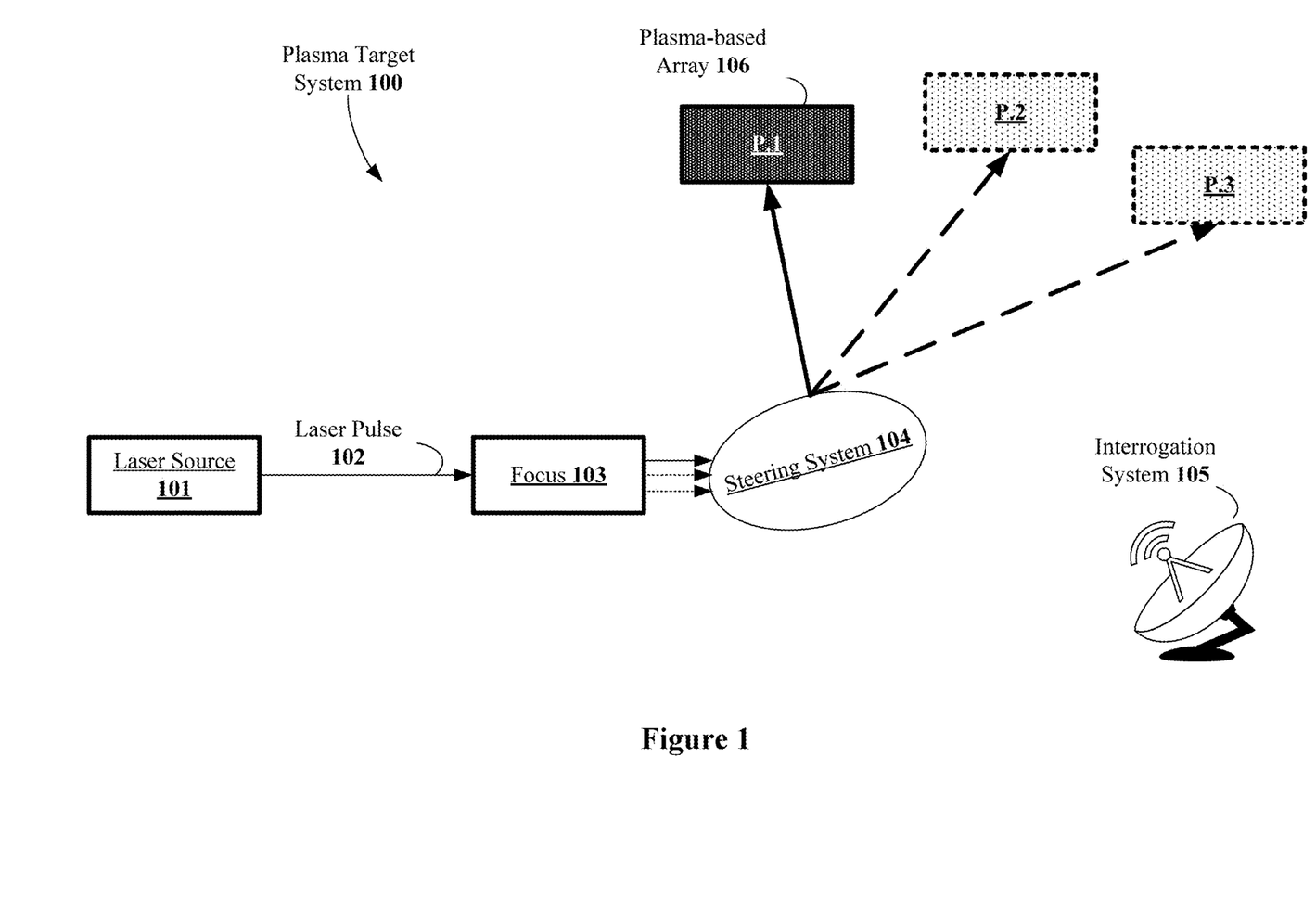
FIG. 1 is an example illustration of a plasma target system.

FIG. 1 is an example plasma-based target system 100 which comprises, consists of, or consists essentially of a laser source 101, laser pulse 102, focus lens 103, steering system 104, interrogation system 105, and plasma-based array 106. The plasma-based target system 100 enables the generation of plasma-based targets for detection by interrogation systems, which may include radar systems. There is a need for test targets with improved efficiency and safety characteristics. Plasma-based test targets are advantageous over traditional targets for a number of reasons. One reason being that plasma-based targets can be generated in many shapes and sizes, which can be formed to create a plurality of test target profiles. Another being that plasma-based targets carry no momentum with their movement, resulting in a reduction in energy needs to move traditional targets and safety concerns associated with the high speed movement. The plasma-based target system 100 may be used in any open testbed, including in outdoors or indoor environments.

The laser source 101 produces an intense short laser pulse 102 in the gigawatt power range for a standard atmosphere. The laser pulse 102 may propagate through any media including, for example, air. In another embodiment, the laser pulse 102 may propagate through an enriched atmosphere. Furthermore, the laser pulse 102 may be divided into a plurality of sub-beams, or, in other words, smaller laser beams. The sub-beams may have a reduced size and/or comprise less energy than the laser pulse 102. When divided, each of the plurality of lasers manifests a single plasma point and, together, they may generate a plasma-based array. The plasma-based array 106 could be manifested in many shapes and sizes, and may, for example, resemble test objects. In another embodiment, the laser pulse 102, or each of the sub-beams, may undergo self-focusing, which generates plasma-filaments.

The laser pulse 102 or the plurality of lasers may pass through a focus lens 103. The focus lens 103 is an optical lens capable of focusing a laser pulse 102 or sub-beam. The geometry of the focus lens 103 may determine the structure or position of the plasma-based array 106.

The steering system 104 comprises, consists, or consists essentially of a steering mirror for directing the laser. After the focus lens 103, plasma lasers enter the steering system 104 and are incident on a steering mirror in a plurality of orientations, directing a plasma-based array 106 into the testbed. The orientation of the steering system 303 determines the position and apparent speed of the plasma-base array 106. The size of the plasma-based array 106 is constrained by the geometry of the focusing optics. In one embodiment, the plasma-based array 106 may be as small as an array comprising a single plasma point. In another embodiment, the plasma-based array 106 may include sizes up to one-thousand meters.

As shown in FIG. 1, the steering system 104 may direct the plasma-based array 106 to a plurality of positions. FIG. 1 demonstrates three positions for the plasma-based array 106, denoted as P.1, P.2, and P.3. Although FIG. 1 displays three positions, the example is intended to be illustrative and not a limitation and not restrictive. The steering system 104 may direct the plasma-based array 106 to any number of locations in the test bed as well as move the plasma-based array 106 across the testbed. In one embodiment, the steering system 104 projects the plasma-based array 106 to a stationary position (having no apparent speed). In another embodiment, the steering mirror may shift, tilt, or pivot positions to create an apparent speed for the plasma-based array 106 in the testbed. This apparent speed for the plasma-based array 106 may be up to many times the speed of sound. In one embodiment, the apparent speed may be hypersonic, which is difficult to induce in traditional test targets.

The interrogation system 105 is one that may detect the position of the plasma-based array 106 by utilizing an incident energy. For example, an interrogation system 105 may direct the incident energy in the direction of the test object and detect a reflecting energy to determine the test object's instantaneous location. In one embodiment, the interrogation system 105 deploys radio frequencies to detect the instantaneous location of the plasma-based array 106. Such detecting may, for example, be applied to test a radar system's detection and tracking functionalities. To the interrogation system 105, the plasma-based array 106 appears as a solid object.

By mimicking a typical radar test target, a plasma-based array 106 avoids the downsides of a typical test target. It is desirable to have a target with no momentum or inertia, for instance, to eliminate the need to accelerate, control, and decelerate typical radar test targets. The instant plasma-based target system 100 may instantaneously present a plasma-based target, move it at the speed desired, and change its direction at the will of the operator. The a plasma-based target could move in any directing in three-dimensional space, including towards the interrogation system 105, away from the interrogation system 105, and at oblique angles to the interrogation system 105.

Figure 2:
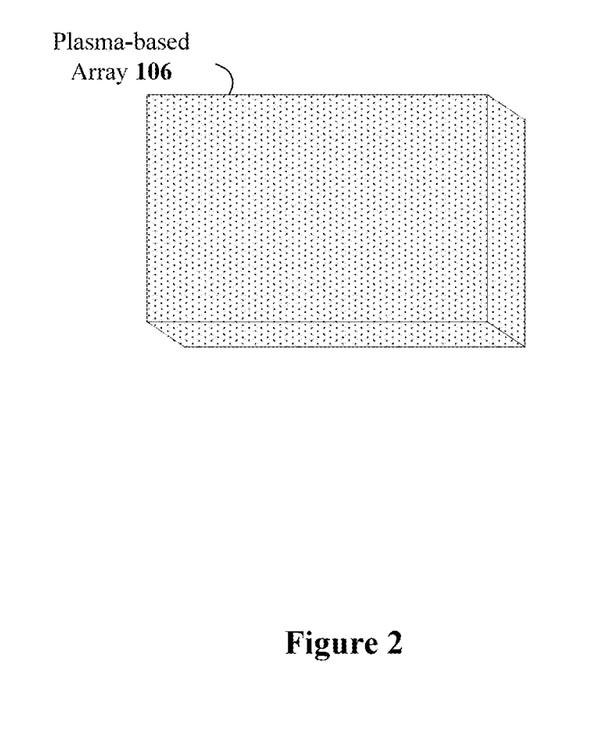
FIG. 2 is an example illustration of a plasma-based array comprising plasma points.

FIG. 2 shows an example of a plasma-based array 106 comprising plasma points. The spacing of the plasma points within the plasma-based array 106 is sufficiently small so as to appear solid to incident frequencies. For example, an incident frequency with an RF wavelength would perceive a plasma point with a 1 centimeter spacing as a solid object, since the plasma point density would be too high for the RF wavelength to pass through. In one embodiment, the plasma-based array 106 comprises plasma points and may raster a three-dimensional target geometry. The plasma points may be arranged to form many different target geometries. For example, the target geometry may resemble a sphere, rectangular prism, or even complex objects such as plane, or missile. By assuming a target geometry, a plasma-based array may be used as test object for detection by an interrogation system 105. This plasma test object may replace a typical test object. For example, one may generate a plasma-based array resembling a missile to test the capabilities or functionality of the radar system. Additionally, by changing the laser pulse 102 parameters (i.e. energy per pulse, repetition rate, wavelength), it is possible to fine tune the plasma target to optimize for a specific system test need.

A plasma-based array 106 may be used to obscure an interrogation system. Obscuring an interrogation system occurs when an interrogation system 105 detects a physical object, but the target is an obscuring plasma-based array 106. The obscuring plasma-based array 106 may take the form of a test target geometry, so as to trick, for example, an interrogation system or its operator. Such obscuring would allow the interrogation system 105 to simulate performance in a degraded environment such as in the presence of chaff or the like. This method of obscuring may be utilized in any industry that utilizes test targets for interrogation systems 105. One such example is testing the detection of obstacles for autonomous vehicles. Autonomous vehicles deploy a multitude of sensing systems that are rigorously tested in order to meet the needs of real-world implementation. Employing plasma-based targets instead of traditional targets would reduce the number of physical objects required for an autonomous vehicle test bed, as well as savings energy and safety associated with the use of physical objects. As another example, a plasma-based array 106 may be used to obscure an enemy radar system, where the enemy is made to believe that a physical object is present where, in reality, it is a plasma-based target.

Figure 3:
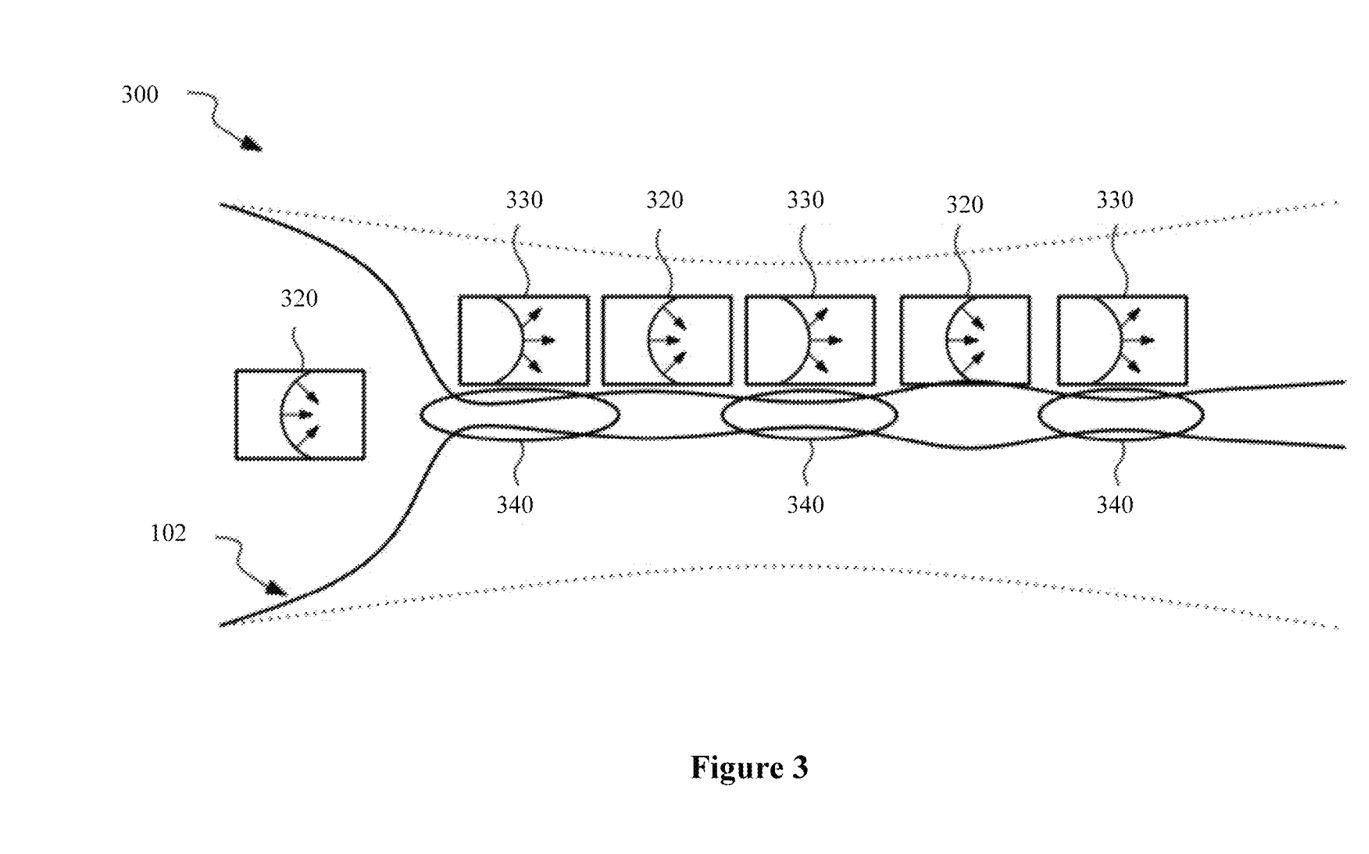
FIG. 3 shows an illustration of a laser beam that will generate a laser-induced plasma filament (LIPF) in accordance with the LIPFs for use as an electromagnetic testbed.

While one embodiment of a plasma-based array 106 comprises plasma points, another may comprise plasma filaments. FIG. 3 shows a diagram 300 of an intense laser pulse 102 with peak power exceeding the critical power threshold as it first undergoes self-focusing. The self-focusing of an intense laser pulse enables the generation of plasma-filaments. The critical power threshold for self-focusing is as follows:

$$P_{CR} = 3.72 \lambda_0^2 / 8\pi n_0 n_2$$

An intense laser pulse has the power required to start self-focusing as defined by the propagation media, on the order of Gigawatts of peak power for near-infrared propagation through sea-level air. In order for self-focusing to occur, a non-vacuum media is required. In one embodiment, the media may be an enriched atmosphere. Laser pulse 102 can be any wavelength appropriate for propagation in the applicable medium. The self-focusing of laser pulse 102 is due to an optical Kerr effect 320 and the diffraction from the resulting plasma 330. The Optical Kerr Effect is based on the non-linear behavior of the refractive index of the medium described by:

$$n = n_0 + n_2 I \text{ where } n_2 \text{ is } \sim 10^{-23} \text{ m}^2/\text{W in air}$$

During its propagation in air, the intense laser pulse 102 first undergoes self-focusing, because of the optical Kerr effect, until the peak intensity becomes high enough ($\sim 5*10^{13}$ W/cm²) to ionize Oxygen molecules. The ionization process involves the simultaneous absorption of, for example, 8-10 infrared photons, and has a threshold-like behavior and a strong clamping effect on the intensity in the self-guided pulse, further described below. A dynamical competition then starts taking place between the self-focusing effect due to the optical Kerr effect and the defocusing effect due to the created plasma 330. During the dynamical competition, there is an equilibrium in the propagation between the self-focusing effect and the plasma defocusing effect.

Plasma Defocusing $$n_p = \sqrt{1 - N/N_c};$$

(Where N is the number of free electrons and $N_c$ is the critical plasma density.)

When the self-focusing gets high, it creates a resulting plasma 330 which causes defocusing. When the intensity is lower due to plasma 330 defocusing, then it starts to self-focus again. This repeating of focusing and defocusing, called self-guiding, continues until the peak intensity is no longer high enough to return to self-focusing and the laser beam begins propagating in a normal fashion.

Peak Pulse Peak Pulse Intensity Due to Intensity Clamping $$I \sim \left( \frac{0.76 n_2 \rho_c}{\sigma_K t_p \rho_{nt}} \right)^{1/(K-1)}$$

Peak Plasma Density:

$$\rho(I) \sim \left( \frac{(0.76 n_2 \rho_c)^K}{\sigma_K t_p \rho_{nt}} \right)^{1/(K-1)}$$

Filament Size:

$$\omega_0 \sim \left( \frac{2 P_{cr}}{\pi} \right)^{1/2} \times \left( \frac{\sigma_K t_p \rho_{nt}}{0.76 n_2 \rho_c} \right)^{1/2(K-1)}$$

As a result, the pulse maintains a small beam diameter and high peak intensity over large distances. In one embodiment, the pulse maintains a small beam diameter and high peak intensity up to three miles. In the wake of the self-guided pulse, a plasma filament 340 is created with an initial density of $10^{13}$-$10^{17}$ electrons/cm³ over a distance which depends on initial laser conditions, types of focus 302 lenses, and distances. A plasma filaments 340 can be created over a distances of hundreds of meters. These types of parameters support plasma/electromagnetic field interactions such as reflection and refraction. Optical beams of low power propagate in a manner that is described by standard Gaussian propagation equations. In this type of propagation, the beam size at the focus of the system is only generally maintained to a distance around the focal region called the Rayleigh range. In high-power self-guiding propagation, this small beam size is maintained as long as the pulse intensity is high enough to continue generating Kerr self-focusing, generally 10× or more the Rayleigh range.

Figure 4:
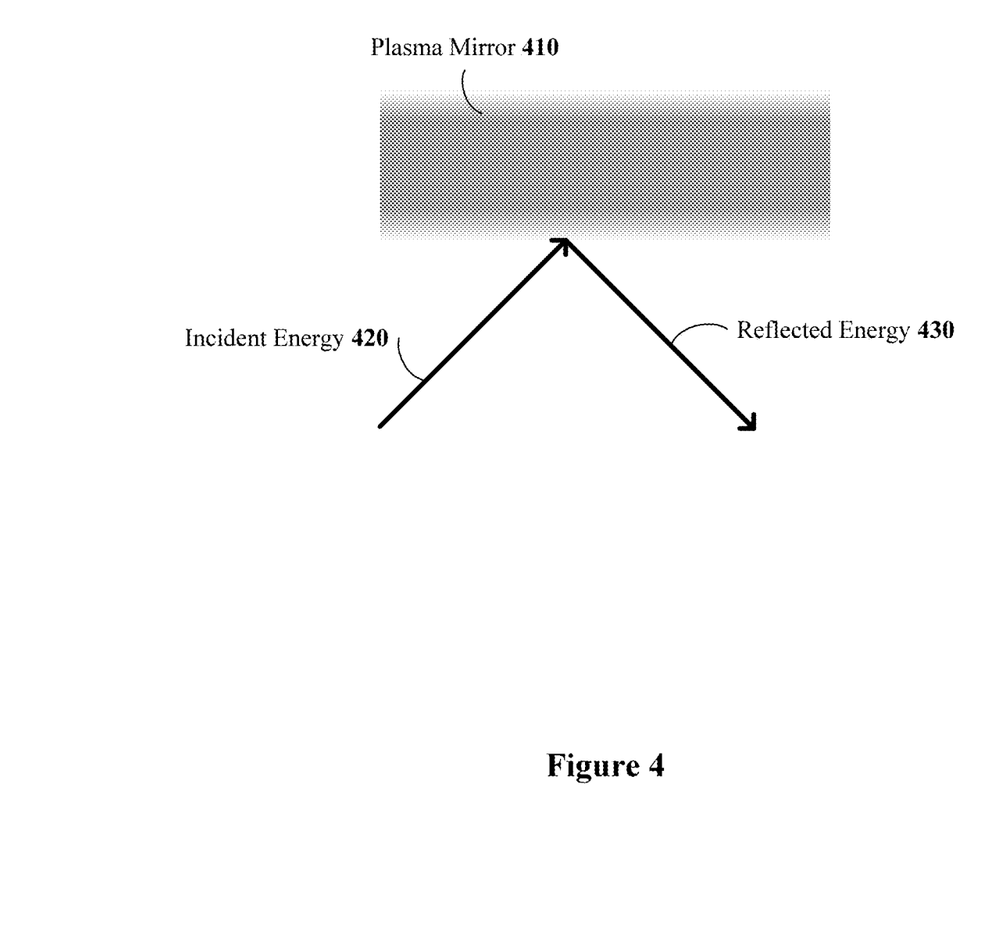
FIG. 4 shows an example of a reflective plasma mirror in accordance with the laser induced plasma filament targets for use as an electromagnetic testbed.

FIG. 4 illustrates reflection characteristics for a plasma mirror 410. Through optical beam forming techniques, an array of plasma mirror 410 can be created, a closely spaced array of plasma filaments, creating a layer of excited electrons in the air. This layer can be used as a reflective surface, or mirror, for incident energies 420 whose frequencies are below the plasma frequency, reflecting the power away from the intended path. To a beam of interrogation energy, the closed spaced array of plasma filaments act as a sheet because the spacing of the filaments is much smaller than the wavelength of the interrogation beam. In one embodiment, the wavelength of the incident energy is ten times the size of the filament spacing. Incident energies may include, but are not limited to Very Low Frequency (VLF) to near Terahertz. Where incident energy 420 is incident on the plasma mirror 410, reflective energy 430 is reflected back to interrogation system 105.

In one embodiment, the incident energy 420 may be laser energy. In order to reflect laser energy, sheet-like layers of plasma filaments are required to achieve mirror characterizes for plasma mirrors 410 subject to laser energy. To form sheet-like layers, the closely spaced array of plasma filaments is aligned to form planar layers. When layered, plasma filaments are capable of reflecting of laser energies. The layering can also be used instead to deflect, diffract, or redirect the incident energy in a different direction.

Figure 5:
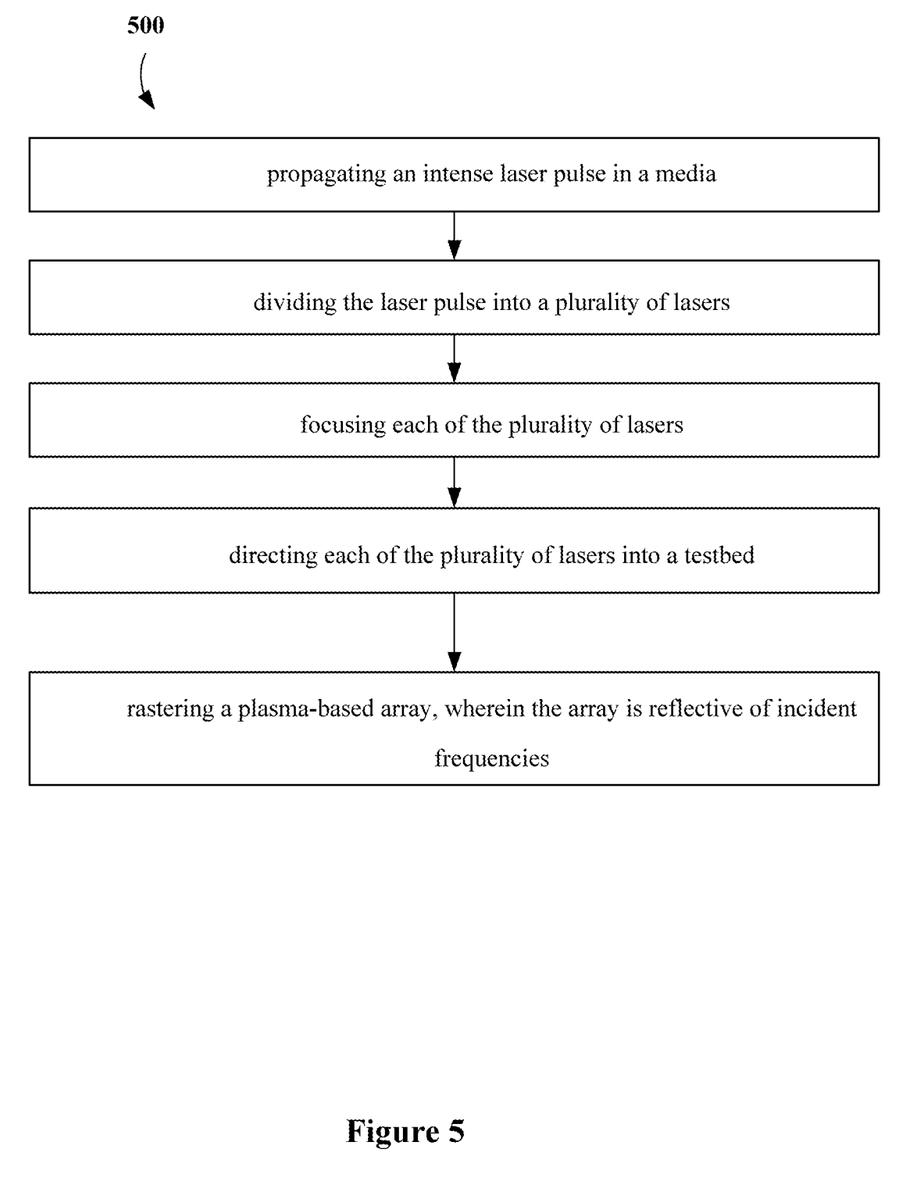
FIG. 5 is a block diagram illustration of a method to steering a plasma-based array.

FIG. 5 is a method 500 comprising the steps of propagating an intense laser pulse in a media, dividing the laser pulse into a plurality of lasers, focusing each of the plurality of lasers, directing each of the plurality of lasers into a testbed, rastering a plasma-based array, wherein the array is reflective of incident frequencies.

Figure 6:
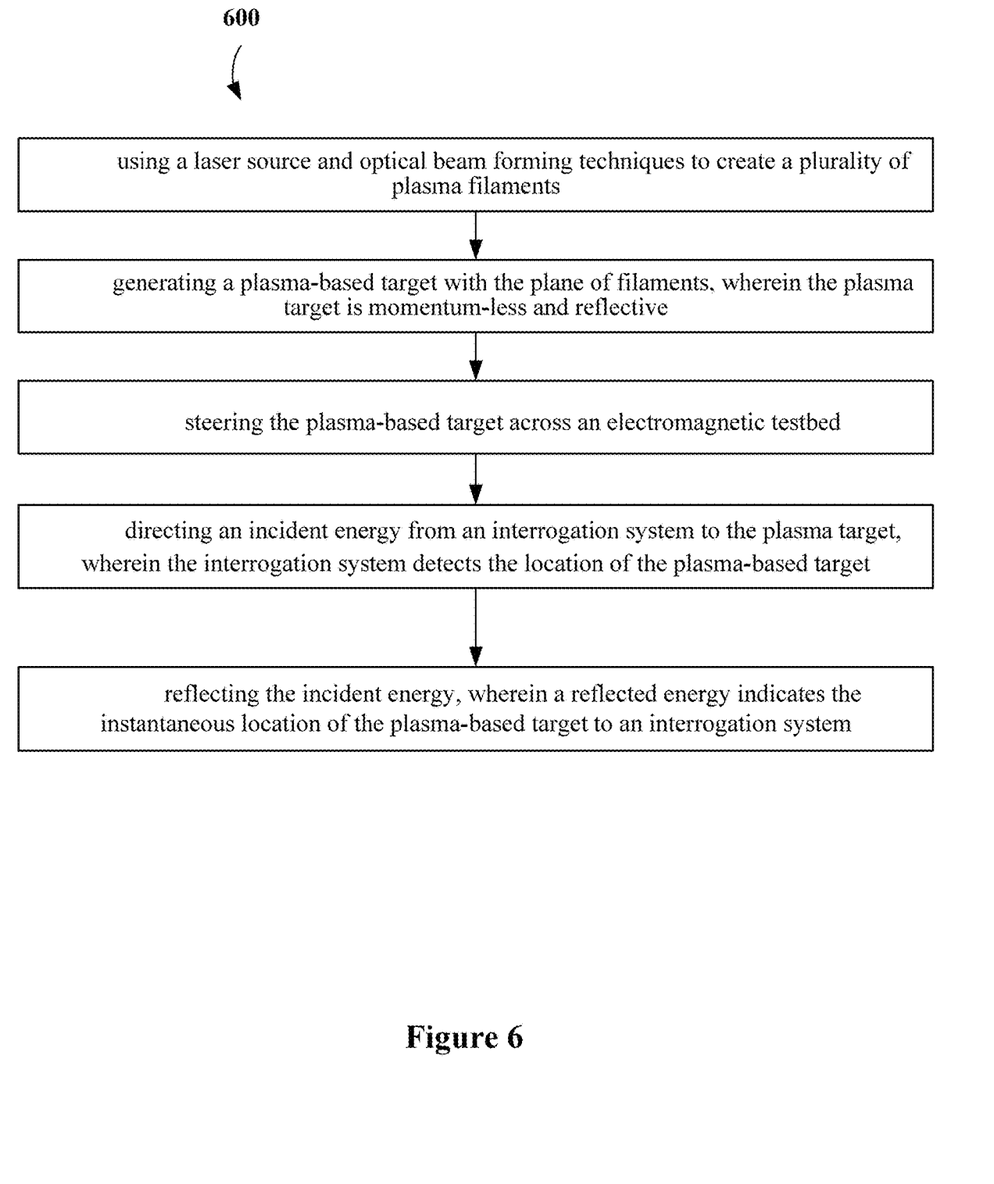
FIG. 6 is a block diagram illustration of a method to detect a plasma-based test target.

FIG. 6 is a method 600 to detect a plasma-based test target comprising the steps of using a laser source and optical beam forming techniques to create a plurality of plasma-based points, generating a plasma target with the plurality of plasma-based points, wherein the plasma target appears solid to incident frequencies, directing an incident energy from an interrogation system to the plasma target, wherein the interrogation system detects the location of the plasma-based target, receiving reflected energy, wherein the reflected energy indicates the instantaneous location of the plasma-based target to an interrogation system.

From the above description of Laser Induced Plasma Filament Targets for Use as an Electromagnetic Testbed, it is manifest that various techniques may be used for implementing the concepts of a Laser Indicted Plasma Filament Target for Use as an Electromagnetic Testbed without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the Laser Induced Plasma Filament Targets for Use as an Electromagnetic Testbed is not limited to the particular embodiments described herein, but is capable of many embodiments without departing from the scope of the claims.

We claim:

1. A method comprising the steps of:
propagating an intense laser pulse in a media;
dividing the laser pulse into a plurality of lasers;
focusing each of the plurality of lasers;
directing each of the plurality of lasers into a testbed; and
rastering a plasma-based array, wherein the array is reflective of incident frequencies.

2. The method of claim 1, further comprising:
steering the plasma-based array across a testbed.

3. The method of claim 1, further comprising:
detecting the location of the plasma-based array in the testbed.

4. The method of claim 1, wherein the plurality of laser undergo self-focusing to generate a plurality of plasma-based filaments.

5. The method of claim 1, wherein rastering the plasma-based array produces a three-dimension target geometry.

6. The method of claim 1, wherein the incident frequency is radio frequency.

7. The method of claim 1, wherein the plurality of lasers undergo self-focusing to form a plurality plasma-filaments.

8. The method of claim 7, wherein the plurality of plasma-filaments form a sheet-like plasma mirror.

9. The method of claim 7, wherein the incident frequency is laser frequency.

10. The method of claim 1, further comprising the step of:
obscuring an interrogation system with plasma-based array, wherein the plasma-based array has assumed a target profile.

11. The method of claim 1, wherein steering the plasma-array induces a hypersonic apparent speed.

12. The method of claim 1, wherein the media is air.

13. A method to detect a plasma-based test target comprising the steps of:
using a laser source and optical beam forming techniques to create a plurality of plasma-based points;
generating a plasma target with the plurality of plasma-based points, wherein the plasma target appears solid to incident frequencies;
directing an incident energy from an interrogation system to the plasma target, wherein the interrogation system detects the location of the plasma-based target; and
receiving reflected energy, wherein the reflected energy indicates the instantaneous location of the plasma-based target to an interrogation system.

14. The method of detecting a plasma-based test target of claim 13, further comprising:
steering the plasma target across a testbed.

15. The method of claim 14, further comprising:
using the plasma-based target to obscure an interrogation system.

16. The method of using an electromagnetic testbed of claim 13, wherein the plurality of plasma points form a three-dimensional test object.

17. The method of using an electromagnetic testbed of claim 13, wherein the incident energy is radio frequency.

18. A plasma target system, comprising:
a laser source for generating a short laser pulse;
a focus lens for focusing the laser pulse;
a steering system for directing the laser pulse into a testbed;
a plasma-based array that serves as a target for the testbed; and
an interrogation system utilizing an incident frequency for tracking the plasma-based array.

19. The plasma target system of claim 18, further comprising:
a plurality of steering mirrors for increasing the movement speed of the plasma array.

20. The method of using an electromagnetic testbed of claim 18, wherein the incident energy is radio frequency.

* * * * *